United States Patent
Lyons et al.

(10) Patent No.: US 10,790,066 B2
(45) Date of Patent: Sep. 29, 2020

(54) ROTATIONAL APPARATUS USABLE WITH CONTROL DRUM APPARATUS IN NUCLEAR ENVIRONMENT

(71) Applicant: Westinghouse Electric Company LLC, Cranberry Township, PA (US)

(72) Inventors: John L. Lyons, Pittsburgh, PA (US); Yasir Arafat, Pittsburgh, PA (US); Jurie Van Wyk, Cranberry Township, PA (US); Luke D. Czerniak, Mount Pleasant, PA (US); James L. Yankel, Trafford, PA (US); Matthew R. Heisel, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 147 days.

(21) Appl. No.: 15/830,632

(22) Filed: Dec. 4, 2017

(65) Prior Publication Data
US 2019/0172594 A1    Jun. 6, 2019

(51) Int. Cl.
*G21C 7/14* (2006.01)
*G21C 7/12* (2006.01)
*G21C 7/28* (2006.01)
*G21C 9/02* (2006.01)

(52) U.S. Cl.
CPC ............... *G21C 7/12* (2013.01); *G21C 7/14* (2013.01); *G21C 7/28* (2013.01); *G21C 9/02* (2013.01)

(58) Field of Classification Search
CPC ... G21C 7/12; G21C 7/14; G21C 7/28; G21C 9/02
See application file for complete search history.

(56) References Cited

U.S. PATENT DOCUMENTS 3,141,383 A * 7/1964 Abild .................. G21C 7/16
                                                                91/45
3,161,014 A * 12/1964 Abild .................. G21C 7/14
                                                                60/698

(Continued)

FOREIGN PATENT DOCUMENTS

CN    107004447 A    8/2017
JP    04320993 A    11/1982

(Continued)

OTHER PUBLICATIONS

International Search Report and Written Opinion dated Aug. 23, 2019, 11 pages.

*Primary Examiner* — Lily C Garner
(74) *Attorney, Agent, or Firm* — K&L Gates LLP (57) ABSTRACT

A rotation apparatus is usable with a control drum in a nuclear environment. The control drum is situated on a shaft that is rotatable about a horizontal axis of rotation, and the control drum includes an absorber portion and a reflector portion. The rotation apparatus includes a rotation mechanism that is structured to apply to the shaft in an operational position a force that biases the shaft to rotate toward a shutdown position, with the force being resisted by a motor to retain the shaft in the operational position when the motor is powered. The force is not resisted when the motor is unpowered. The rotation apparatus further includes a rotation management system that controls the rotation of the shaft.

16 Claims, 7 Drawing Sheets

(56) References Cited

U.S. PATENT DOCUMENTS

| | | | | |
|---|---|---|---|---|
| 5,410,578 A | * | 4/1995 | Walton | G21C 1/12 |
| | | | | 376/318 |
| 2010/0316177 A1 | * | 12/2010 | Stambaugh | G21C 7/117 |
| | | | | 376/229 |
| 2017/0263345 A1 | | 9/2017 | Venneri et al. | |

FOREIGN PATENT DOCUMENTS

| | | |
|---|---|---|
| JP | 10026685 A | 1/1998 |
| KR | 101502700 B1 | 3/2015 |

\* cited by examiner

ROTATIONAL APPARATUS USABLE WITH CONTROL DRUM APPARATUS IN NUCLEAR ENVIRONMENT

BACKGROUND

1. Field

The disclosed and claimed concept relates generally to nuclear power generation equipment and, more particularly, to a rotation apparatus usable in conjunction with a control drum that is employed in a nuclear environment.

2. Related Art

Numerous types of nuclear fission reactors are known in the relevant art. As a general matter, such nuclear reactors include a reactor vessel within which is situated an amount of fissile material and a number of control structures that control the reactivity of the nuclear fission reaction. In certain types of nuclear reactors, control rods are provided as the control structures. Such control rods are received by varying, distances into the fissile material wherein the rods function as absorber devices that progressively reduce the reactivity of the fission reaction as the rods are received into the fissile material.

Another type of control structure is a control drum that is of an approximately cylindrical shape and which is situated on a pivotable shaft. The control drum includes a reflector portion and an absorber portion. The shaft is rotatable about an axis of rotation to cause the reflector portion to face toward a core of the nuclear environment in an operational state of the nuclear environment. The shaft is rotated about the axis of rotation to cause the absorber portion to face toward the core to result in a shutdown condition of the reactor. For instance, the reflector portion reflects neutrons back to the core in the operational state, and the reflector portion absorbs neutrons in the shutdown state. While control drums of this type have been generally effective for their intended purposes, they have not been without limitation.

Such control drums are typically rotated by stepper motors which require electrical power in order to operate. In a situation in which an emergency shutdown of the reactor is desired, an absence of electrical power to operate the stepper motors to move the control drums to the shutdown positions could potentially result in a catastrophic situation. Furthermore, in the event that the nuclear environment is capable of being physically transported from one location to another, it is desirable to ensure that the absorber portion of the control drum faces toward the core in order to avoid a possible unintended startup of the reactor. Such an unintended startup of the reactor potentially could occur if the reflector portion of the control drum were inadvertently repositioned to be fully or partially facing toward the core. While the stepper motors that control the control drums typically can maintain an orientation of the control drum such that the reflector portion faces away from the core, such control potentially can be lost if any such stepper motor loses electrical power, and the transporting of the nuclear environment from one location to another raises a significant potential of a loss of electrical power. Improvements thus would be desirable.

SUMMARY

An improved rotation apparatus is usable with a control drum in a nuclear environment. The control drum is situated on a shaft that is rotatable about a horizontal axis of rotation, and the control drum includes an absorber portion and a reflector portion. The rotation apparatus includes a rotation mechanism that is structured to apply to the shaft in an operational position a force that biases the shaft to rotate toward a shutdown, position, with the force being resisted by a motor to retain the shaft in the operational position when the motor is powered. The force is not resisted when the motor is unpowered. The rotation apparatus further includes a rotation management system that controls the rotation of the shaft.

Accordingly, an aspect of the disclosed and claimed concept is to provide a rotation apparatus that is operable in the event of an electrical power failure to move a control drum from an operational position to a shutdown position.

Another aspect of the disclosed and claimed concept is to provide such a rotation apparatus that rapidly moves the control drum to the shutdown position in the absence, of electrical power.

Another aspect of the disclosed and claimed concept is to provide such a rotation apparatus that additionally can retain the control drum in the shutdown position when the nuclear environment is being transported from one location to another and in the absence of electrical power in such a situation.

Accordingly, an aspect of the disclosed and claimed concept is to provide an improved rotation apparatus usable with a control drum in a nuclear environment, the control drum having a shaft that is rotatable about an axis of rotation that is horizontal, a reflector portion situated on the shaft, an absorber portion situated on the shaft, and a motor which, when powered, is operable to move the shaft between an operational position wherein the reflector portion faces toward a core of the nuclear environment and a shutdown position wherein the absorber portion faces toward the core. The rotation apparatus can be generally stated as including a rotation mechanism which is structured to apply to the shaft in the operational position a force that is structured to rotate the shaft toward the shutdown position, the force being resisted by the motor to retain the shaft in the operational position when the motor is powered, the force not being resisted when the motor s unpowered, and a rotation management system that is structured to resist rotation of the shaft when the shaft is in the shutdown position.

Other aspects of the disclosed and claimed concept are provided by an improved rotation management system that is usable with a control drum in a nuclear environment, the control drum having a shaft that is rotatable about an axis of rotation that is horizontal, a reflector portion situated on the shaft, an absorber portion situated on the shaft, and a motor which, when powered, is operable to move the shaft between an operational position wherein the reflector portion faces toward a core of the nuclear environment and a shutdown position wherein the absorber portion faces toward the core. The rotation management system can be generally stated as including an actuator, a bolt that is situated on the actuator, and the actuator being operable to move the bolt between a first location engaged with, the shaft in the shutdown position and a second location disengaged from the shaft, the bolt in the first position being structured to resist rotation of the shaft.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
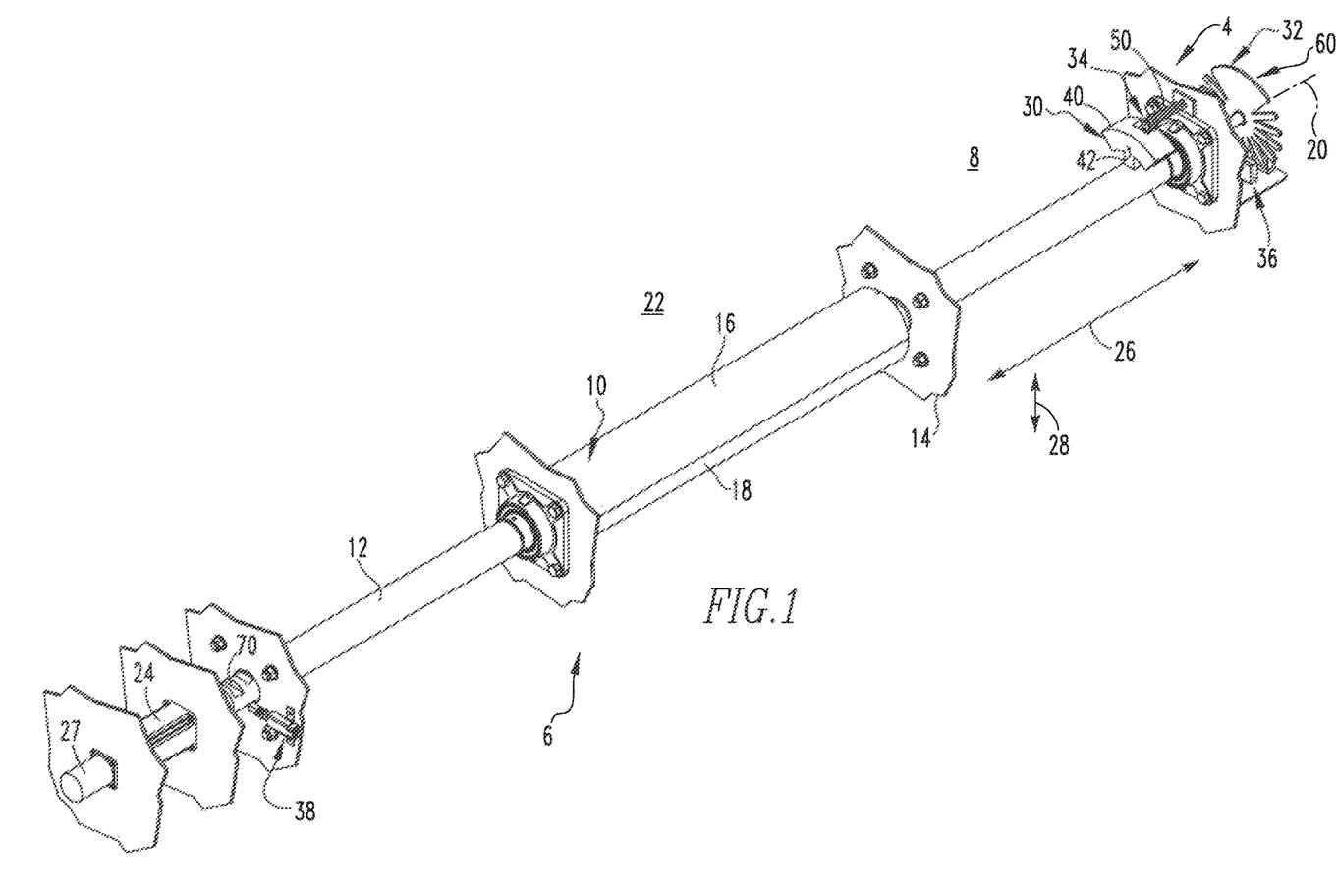
FIG. 1 is a perspective view of an improved control drum apparatus having an improved rotation apparatus in accordance with a first embodiment of the disclosed and claimed concept, with the control drum apparatus being in an operational position.
Figure 2:
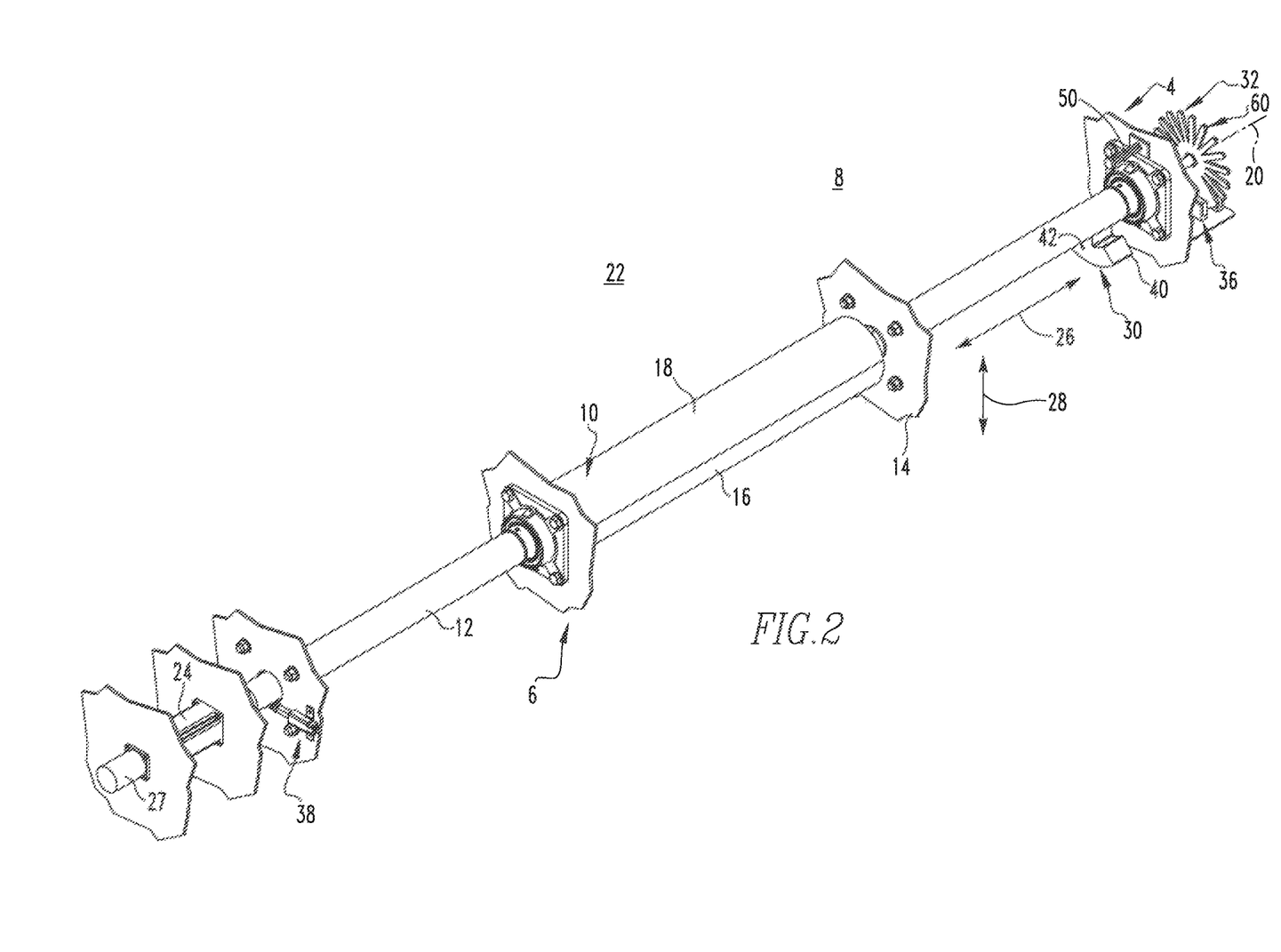
FIG. 2 is a view similar to FIG. 1, except depicting the control drum apparatus n a shutdown position.

An improved rotation apparatus 4 in accordance with a first embodiment of the disclosed and claimed concept is depicted in FIGS. 1 and 2 as being a part of an improved drum control apparatus 6. The control drum apparatus 6 is a part of a nuclear environment 8 such as might include a nuclear reactor, a nuclear power plant, by way of example and without limitation.

As can be understood from FIGS. 1 and 2, the control drum apparatus 6 can be said to include, in addition to the rotation apparatus 4, a control drum 10, and a shaft 12 upon which the control drum 10 is situated. The nuclear environment 8 includes a support 14 upon which the shaft 12 is rotatably disposed. The control drum 10 can be said to include a reflector portion 16 that is configured to reflect neutrons in the nuclear environment 8 and an absorber portion 18 that is configured to absorb neutrons in the nuclear environment 8. The shaft 12 is rotatable about an axis of rotation 20 by operation of a stepper motor 24 that is connected between the support 14 and the shaft 12.

The stepper motor 24 is electrically operable to rotate the shaft 12 and the control drum 10 situated thereon between an operational position, such as is depicted generally in FIG. 1, and a shutdown position, such as is depicted generally in FIG. 2. In the operational position of FIG. 1, the reflector portion 16 faces generally toward a core 22 of the nuclear environment 8 and thereby enhances the reactivity of the fission reaction in the core 22. In the shutdown position of FIG. 2, the absorber portion 18 faces generally toward the core 22 and absorbs neutrons to reduce the reactivity of the fission reaction.

The control drum apparatus 6 includes the aforementioned stepper motor 24 and further includes an encoder 27 that is connected with the stepper motor 24 or the shaft 12 and which outputs a series of pulses that are representative of rotational movement of the shaft 12 about the axis of rotation 20. The pulses are detected by a control system of the control drum apparatus 6 in order to continually ascertain the rotational position of the control drum 10 with respect to the core 22 and/or with respect to other structures.

In the depicted exemplary embodiment, the axis of rotation 20 is oriented along the horizontal direction, such as is indicated at the numeral 26. It is understood that the horizontal direction 26 is perpendicular to the vertical direction, such as is indicated at the numeral 28.

The rotation apparatus 4 can be said to include a rotation mechanism 30 and a rotation management system 32. As will be set forth in greater detail below, the rotation mechanism 30 applies a force to the shaft 12 in the operational position to bias the shaft toward the shutdown position. The force is resisted by the stepper motor 24 when the stepper motor 24 is energized. When the stepper motor 24 is de-energized, such as in the event of a failure of electrical power to the stepper motor 24, the force that is applied by the rotation mechanism 30 to the shaft 12 is no longer resisted by the stepper motor 24, and the force thus rotates the shaft 12 from the operational position of FIG. 1 toward the shutdown position of FIG. 2. While the word "force" has been used herein, it is understood that such force is being applied to the shaft 12 which is rotatable, and thus it is understood that the word "force" can be used interchangeably with the word "torque" in the context of the rotatable shaft 12 inasmuch as the force is being applied at a distance from the axis of rotation 20, which will result in a torque being applied to the shaft 12.

Figure 5:
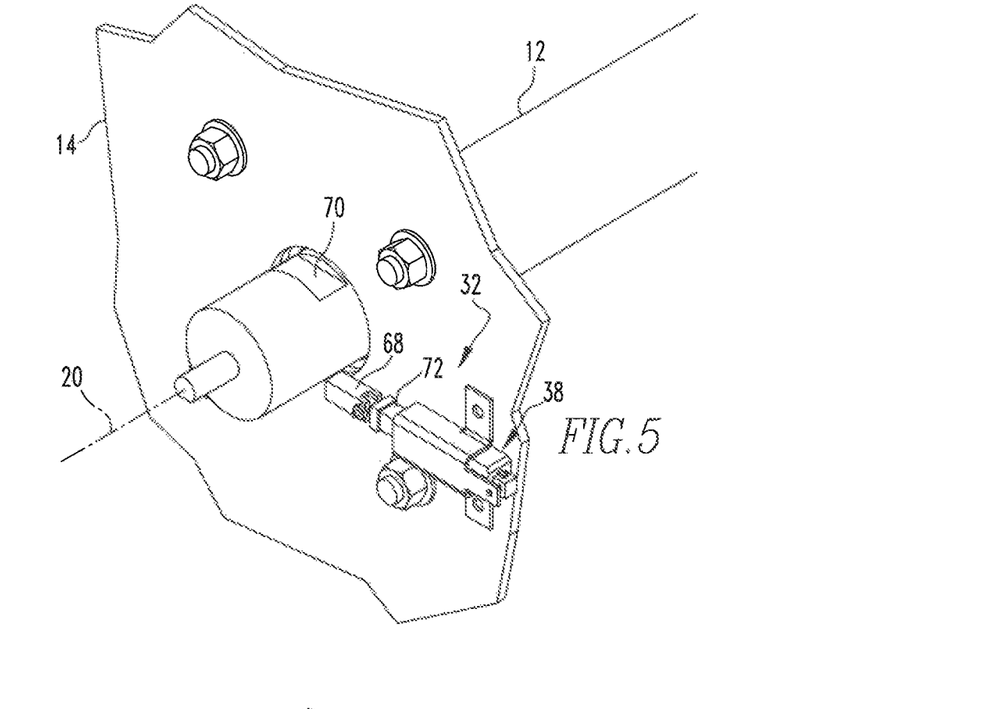
FIG. 5 is a view of another portion of the control drum apparatus of FIG. 1.
Figure 6:
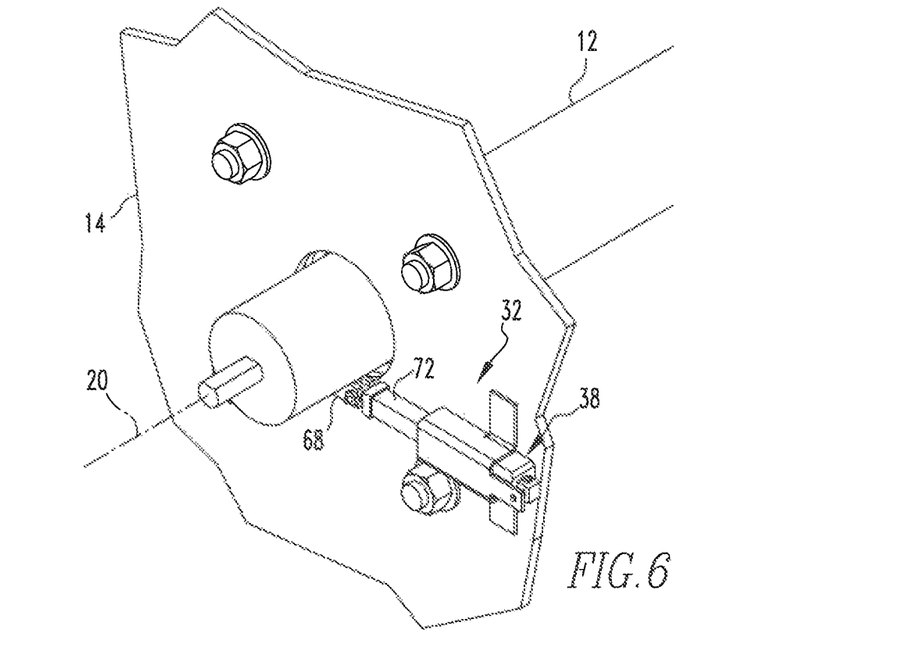
FIG. 6 is a view similar to FIG. 5, except depicting the other portion of the control drum apparatus in the shutdown position.

As will be set forth in greater detail below, the rotation management system 32 can be said to include a rotation initiator 34, an eddy current brake 36, and a lock 38. As will likewise be set forth in greater detail below, the rotation initiator 34 initiates rotational movement of the shaft 12 away from the operational position that is depicted generally in FIGS. 1, 3, and 5. The eddy current brake 36 controls the rotational velocity of the shaft 12 as the shaft 12 is approaching the shutdown position. The lock 38 resists rotation of the shaft 12 away from the shutdown position.

Figure 3:
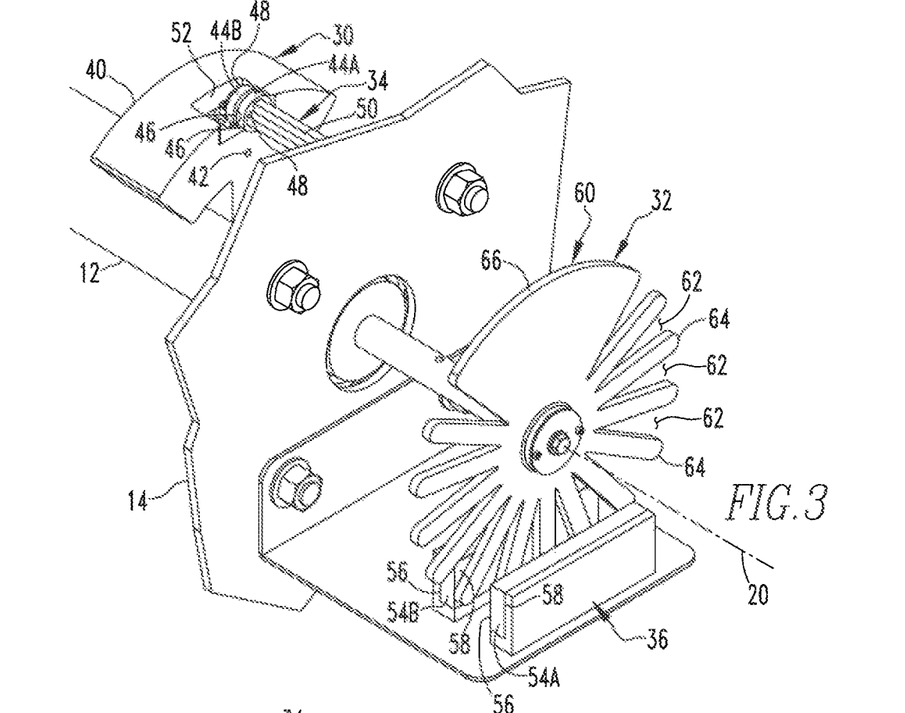
FIG. 3 is a view of a portion of the control drum apparatus of FIG. 1.

As can, be understood from FIGS. 1-4, the rotation mechanism 30 can be said to include a weight 40 having a center of gravity 42 that is spaced from the axis of rotation 20. The weight 40 is affixed to the shaft 12 and thus moves with the shaft 12 between the operational and shutdown positions. Inasmuch as the center of gravity 42 is spaced from the axis of rotation 20, the weight 40 can be referred to as a counterweight that applies a torque to the shaft 12 by operation of gravity depending upon the position of the center of gravity 42 with respect to the axis of rotation 20. For instance, when the center of gravity 42 is situated directly vertically above the axis of rotation 20, such as is depicted in FIGS. 1 and 3, which is when the shaft 12 is in the operational position, the weight 40 at most merely applies a vertically downward force on the shaft 12 without applying a torque to the shaft 12. In such condition, the weight 40 can be said to be situated in a state of equipoise above the axis of rotation 20. However, when the center of gravity 42 is anywhere other than situated directly vertically above the axis of rotation 20, the distance along the horizontal direction 26 between the axis of rotation 20 and the center of gravity 42 is the distance from the axis of rotation 20 at which the weight 40 is applied to the shaft 12 to result in a torque being, applied to the shaft 12.

The rotation initiator 34 thus provides an initial rotation of the shaft 12 away from the operational position of FIGS. 1 and 3 to initiate rotation of the shaft 12 from the operational position toward the shutdown position in the event that a shutdown is needed when the stepper motor 24 is in an unpowered condition. More specifically, and as can be understood from FIGS. 3 and 4, the rotation initiator 34 includes a pair of permanent magnets that are indicated at the numerals 44A and 44B, and which may be collectively or individually referred to herein with the numeral 44. The permanent magnets 44 each include a north pole 46 and a south pole 48 on opposite sides thereof. The permanent magnet 44A is situated on a strut 50 that is disposed on the support 14, and the permanent magnet 44B is situated in a receptacle 52 that is formed on the weight 40. The permanent magnets 44 have their north and south poles 46 and 48 arranged such that they mutually oppose one another when the shaft 12 is in the operational position of FIG. 3.

Figure 4:
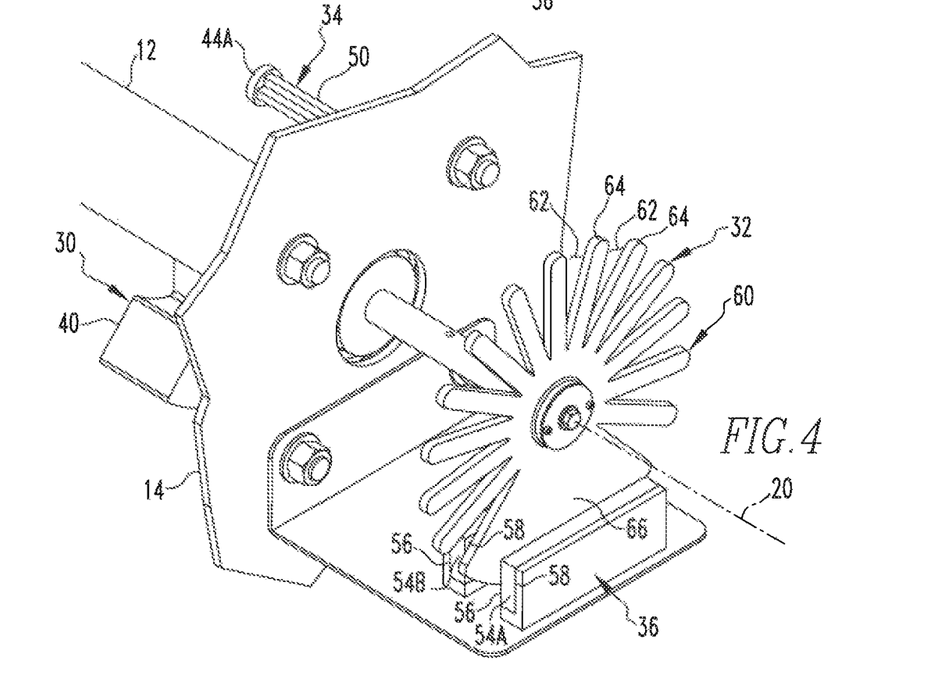
FIG. 4 is a view similar to FIG. 3, except depicting the portion of the control drum apparatus in the shutdown position.

In this regard, it can be said that the weight 40 is in a first position when the shaft 12 is in its operational position, as is depicted generally in FIG. 3, and the weight 40 can be further said to be in a second position when the shaft 12 is in the shutdown position, such as is depicted generally in FIG. 4. In order to avoid the permanent magnets 44 from themselves creating a condition wherein the permanent magnets 44 with their mutual magnetic repulsion are in a state of equipoise, the permanent magnets 44A and 44B are actually slightly offset from one another and not in a state of equipoise when the shaft 12 is in the operational position. The result is that the permanent magnets 44 apply to the shaft 12 another torque that biases the shaft 12 toward the shutdown position but which is overcome by the stepper motor 24 while the stepper motor 24 is electrically energized. The offsetting between the permanent magnets 44A and 44B is on the order of approximately 5-8 rotational degrees of the shaft 12, meaning that the permanent magnets are positioned such that they would directly oppose one another if the shaft 12 were rotated 5-8 rotational degrees, as the case may be, from the operational position. When the shaft 12 is in its operational position and the weight 40 is in its first position, such as is depicted generally in FIGS. 1 and 3, the permanent magnets 44 are already offset from one another by approximately 5-8 rotational degrees such that a loss of electrical power to the stepper motor 24 will immediately result in the mutual opposition of the magnets rotating the shaft 12 beyond the initial 5-8 rotational degree offset toward the shutdown position.

As can be understood from FIGS. 1-4, the center of gravity 42 of the weight 40 is higher in the vertical direction 28 in the first position of FIGS. 1 and 3 than it is in its second position of FIGS. 2 and 4. Since the shaft 12 is oriented parallel with the horizontal direction 26, the weight 40 in the first position has a greater potential energy than in the second position, and such relatively greater potential energy is employed in rotating the shaft 12 with the control drum 10 thereon from the operational position to the shutdown position. When the weight 40 is in the exemplary second position of FIGS. 2 and 4, the center of gravity 42 is situated vertically below the axis of rotation 20, meaning that the center of gravity 42 in the second position and the center of gravity 22 are aligned with one another along the vertical direction 28.

It thus can be seen that the stepper motor 24, when energized, resists the bias of the mutual opposition of the permanent magnets 44 when the weight 40 is in the first position, and this retains the shaft 12 in the operational position. Should the stepper motor 24 become unpowered, however, the bias that is provided by the permanent magnets 44 initiates rotation of the shaft 12 to move the weight 40 from the first position toward the second position. As soon as the center of gravity 42 is offset along the horizontal direction 26 from the axis of rotation 20, gravity being applied to the weight 40 causes the shaft 12 to continue to rotate to the second position of the weight 40, which is the shutdown position of the shaft 12. As such, gravity acting on the weight 40 causes the shaft 12 to be rotated to the shutdown position in the absence of electrical power being applied to the stepper motor 24.

It is noted, however, that the need for a shutdown can sometimes be on an urgent basis, in which situation it would be desired to position the shaft 12 in the shutdown position of FIG. 2 as quickly as possible. Such repositioning to the shutdown position would desirably be without the shaft 12, for instance, rotating beyond the shutdown position and the oscillating back and forth across the shutdown position until the shaft finally settles in the shutdown position. As such, the eddy current brake 36 is provided in order to manage the rotational velocity of the shaft 12 as it approaches the shutdown position.

More specifically, the eddy current brake 36 includes a pair of permanent magnets that are indicted at the numerals 54A and 54B, and which may be collectively or individually referred to herein with the numeral 54. The permanent magnets 54 each include a north pole 56 and a south pole 58, and the permanent magnets 54 are arranged on the support 14 such that one of the north poles 56 faces toward one of the south poles 58 whereby the permanent magnets 54 can be said to mutually attract one another. The eddy current brake 36 further includes a flywheel 60 that is situated on the shaft 12 and which rotates therewith. The flywheel 60 is formed of an electrically conductive material such as aluminum, copper, steel, or other appropriate material. The flywheel 60 has a number of notches 62 formed therein to form a number of radially-oriented fins 64 situated between the notches and a solid portion 66 that is free of notches 62. As employed herein, the expression "a number of" and variations thereof shall refer broadly to any non-zero quantity, including a quantity of one.

When the weight 40 is in the first position of FIG. 3, some of the fins 64 are situated between the permanent magnets 54, and the solid portion 66 is spaced in the vertical direction 28 above the space between the permanent magnets 54. As the shaft 12 begins to rotate from the operational position of FIG. 3 toward the shutdown position of FIG. 4, a subset of the fins 64 successively travel through the space between the permanent magnets 54. When the solid portion 66 begins to travel between the permanent magnets 54, eddy currents are induced in the solid portion 66 by the magnetic field of the permanent magnets 54, it being reiterated that the north and south poles 56 and 58 are arranged such that they mutually attract. According to Lenz's Law, the eddy currents that are induced in the solid portion 66 will create their own magnetic fields which oppose the field of the permanent magnets 54, with such magnetic opposition slowing the rotational velocity of the shaft 12. The aforementioned eddy currents are not induced to a meaningful extent in the fins 64 since they are relatively small along the circumferential direction in comparison with the solid portion 66.

The braking of the shaft 12 by the rotationally-moving reception of the solid portion 66 between the permanent magnets 54 has the effect of slowing the rotation of the shaft 12 to enable the shaft 12 to be positioned such that the center of gravity 42 of the weight 40 is at its vertically lowest possible position. That is, the braking force that is applied to the solid portion 66 by the eddy current brake 36 is directly dependent upon the rotational velocity of the shaft 12 and of the solid portion 66 affixed thereto. As the rotational velocity of the shaft 12 is slowed, the magnetic braking force is correspondingly reduced, and the weight 40 is permitted to move to a position wherein the center of gravity 42 is situated vertically below the axis of rotation 20 without the weight 40 moving past such position and then oscillating back and forth with respect to such position until the weight 40 naturally reaches its lowest point. Rather, since the permanent magnets 54 slow the solid portion 66 by applying a magnetic braking force that is based upon the velocity of the solid portion 66, movement of the solid portion 66 is essentially slowed to the point that the effect of gravity on the weight 40 holds it so that the center of gravity 42 is at its lowest possible position without having moved past its lowest possible position. This rapidly moves the shaft 12 from its operational position to its shutdown position without oscillating back and forth around the shutdown position. This results in a rapid shutdown of the nuclear environment 8, which is desirable.

As further noted above, the rotation management system 32 additionally includes the lock 38 that is depicted generally in FIGS. 1-2 and 5-6. The lock 38 includes a bolt 68 which can be said to constitute a first portion, of the lock 38 and further includes a receptacle 70 that is formed on the shaft 12 and that can be said to constitute a second portion of the lock 38. The lock 38 further includes an actuator 72 that is in the form of a linear actuator and that is situated on the support 14. The linear actuator is operable to move the bolt 68 between a first location, such as is depicted generally in FIG. 6, which corresponds with a locked position of the lock 38, and a second location, such as is depicted generally in FIG. 5, and which corresponds with an unlocked position of the lock 38.

The actuator 72 is electrically powered, but the bolt 68 does not move between the first and second locations unless the actuator 72 is energized. As such, when it is desired to place the shaft 12 in a locked configuration, the shaft 12 is rotated to its shutdown position, and the actuator 72 is energized to linearly move the bolt 68 from the second location of FIG. 5 to the first location of FIG. 6, in which situation the bolt 68 is received in the receptacle 70. The bolt 68 being received in the receptacle 70 resists movement of the shaft 12 away from the shutdown position. The bolt 68 remains in the first location regardless of whether the actuator 72 is electrically powered or is electrically unpowered. The shaft 12 can thus remain in a locked configuration during transport of the nuclear environment 8, by way of example, whether or not the actuator 72 is electrically energized. When the shaft is desired to be unlocked, the actuator 72 is energized to return the bolt 68 from the first position of FIG. 6 to the second position of FIG. 5, and the stepper motor 24 can be energized to rotate the shaft 12 from the shutdown position of FIG. 6 to the operational position of FIG. 5.

It thus can be understood that the rotation apparatus 4 can cause the control drum apparatus 6 to rotate from the operational position to the shutdown position in the event of an electrical power loss to the stepper motor 24. Furthermore, the lock 38 retains the shaft 12 in the locked position of FIG. 6 regardless of whether the actuator 72 continues to be electrically energized after having moved the bolts 68 to the first location of FIG. 6. This combination of features advantageously permits the nuclear environment 8 to be rapidly shut down as needed, even in the event of a failure of electrical power to the stepper motor 24, and the nuclear environment 8 is retained in the shutdown position by virtue of the lock 38 regardless of whether electrical power is available to the actuator 72. Other benefits will be apparent.

Figure 7:
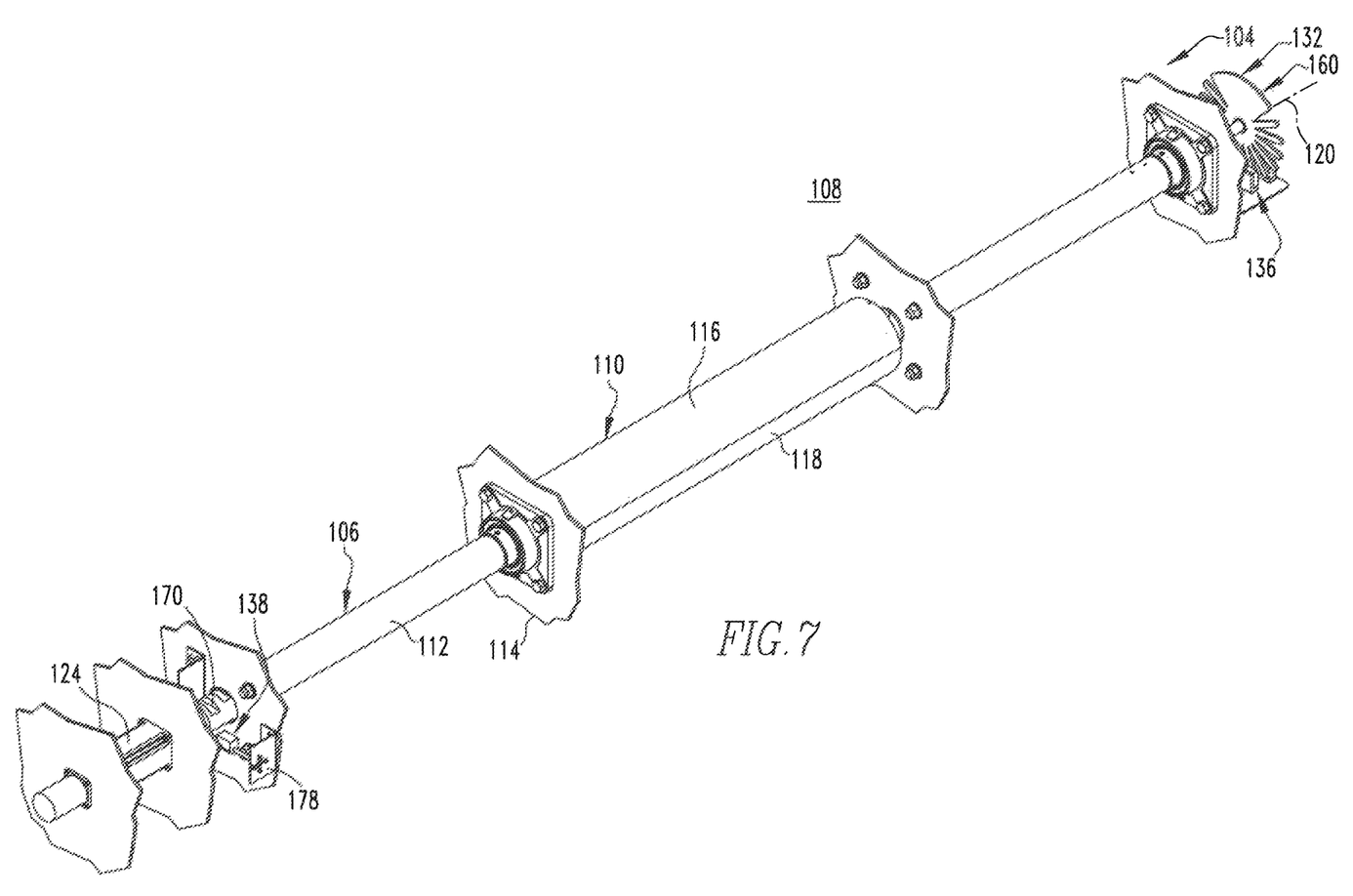
FIG. 7 is a perspective view of another improved control drum apparatus having an improved rotation apparatus in accordance with a second embodiment of the disclosed and claimed concept, with the control drum apparatus being in an operational position.

An improved control drum apparatus 106 is depicted in FIG. 7 and is depicted in part in FIGS. 8-11. The control drum apparatus 106 includes an improved rotation apparatus 104 in accordance with a second embodiment of the disclosed and claimed concept. The control drum apparatus 106 is similar to the control drum apparatus 6 in that it includes a control drum 110 situated on a shaft 112 that is rotatably disposed on support 114, with the control drum 110 including a reflector portion 116 and an absorber portion 118, and with the shaft 112 being rotatable about an axis of rotation 120 by operation of a stepper motor 124. The rotation apparatus 104 is different from the rotation apparatus 4 in that it includes a rotation mechanism 130 and a rotation management system 132 that are different than the rotation mechanism 30 and the rotation management system 32.

Figure 8:
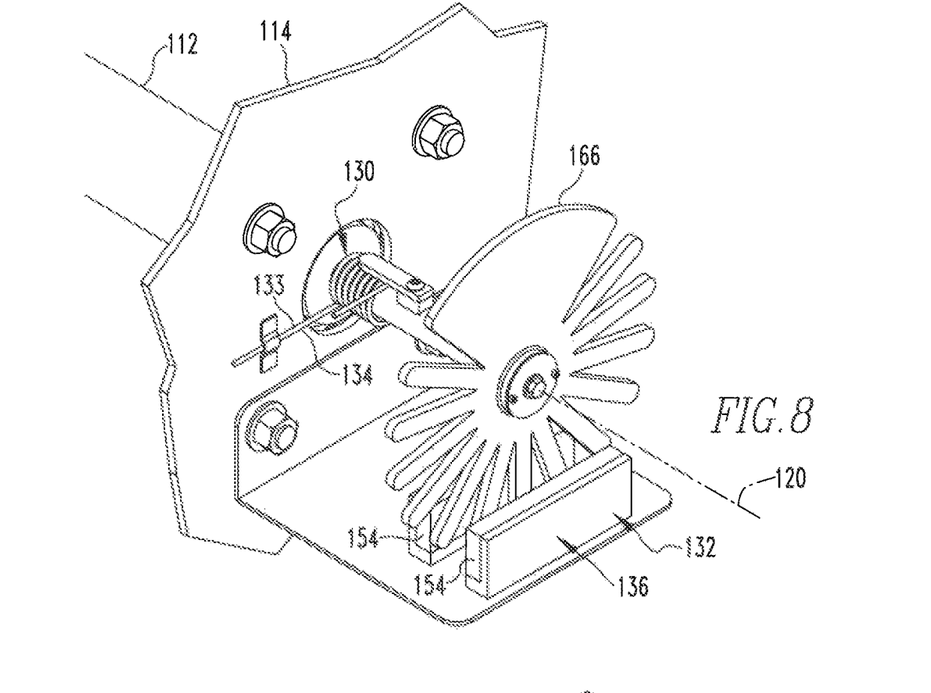
FIG. 8 is a view of a portion of the other control drum apparatus of FIG. 7.
Figure 9:
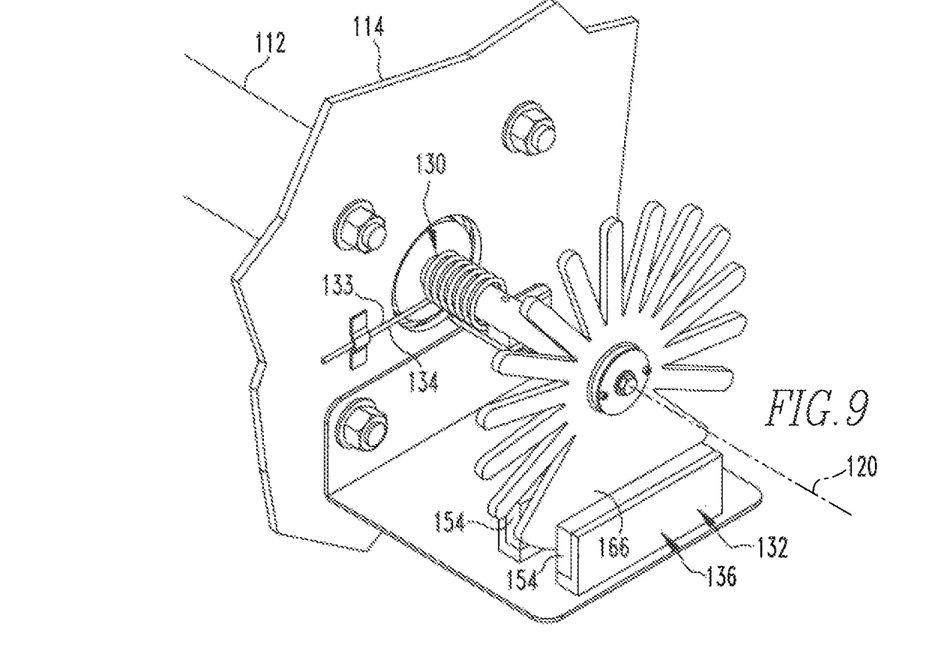
FIG. 9 is a view similar to FIG. 8, except depicting the portion of the other control drum apparatus in a shutdown position.
Figure 10:
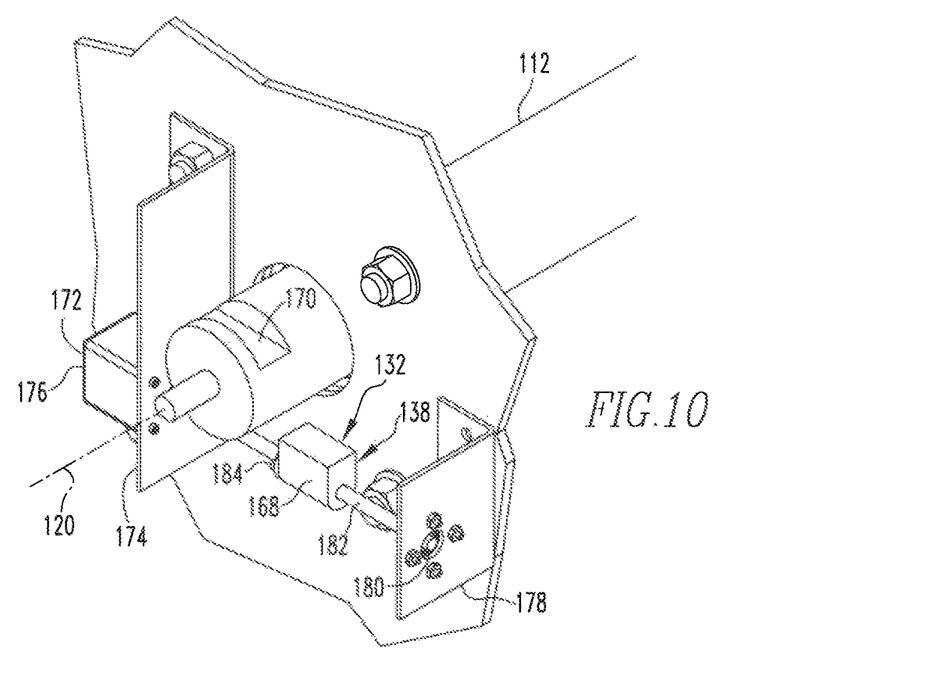
FIG. 10 is a view of another portion of the other control drum apparatus of FIG. 7.
Figure 11:
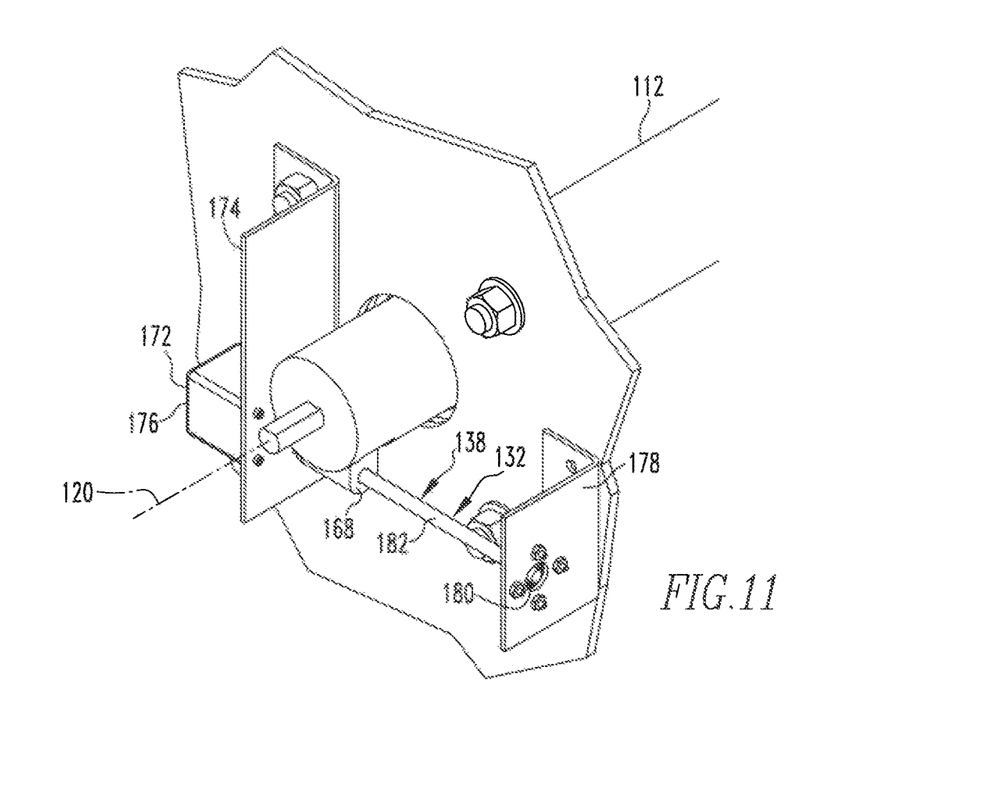
FIG. 11 is a view similar to FIG. 10, except depicting the other portion the other control drum apparatus in a shutdown position.

More specifically, the rotation mechanism 130 includes a spring 133 that extends between the support 114 and the shaft 112 and which, in the operational position of FIG. 8, is elastically deflected such that the spring 133 biases the shaft 112 from the operational position of FIG. 8 toward the shutdown position of FIG. 9. The stepper motor 124 resists this bias when the stepper motor 124 is energized. The spring 133 thus applies to the shaft 112 the force, i.e., torque, that is needed to rotate the shaft 112 from the operational position of FIG. 8 to the shutdown position of FIG. 9 when the stepper motor 124 becomes de-energized. The spring 133 thus also serves as a rotation initiator 134 of the rotation management system 132.

The rotation apparatus 104 additionally includes an eddy current brake 136 that is cooperable with a flywheel 160 in order to slow the rotational velocity of the shaft 112 when a solid portion 166 of the flywheel 160 is being received between a pair of permanent magnets 154 of the eddy current brake 136, which is when the shaft 112 is beginning to reach the shutdown position.

In the depicted exemplary embodiment, the spring 133 is elastically in a free and undeflected state in the shutdown position of FIG. 9. The operation of the eddy current brake 136 on the flywheel 160 reduces the rotational velocity of the shaft 112 as the shaft 112 is beginning to reach the shutdown position so that the shaft 112 settles to the shutdown position wherein the spring 133 is in an elastically undeflected free state. This advantageously avoids the shaft 112 from moving past the shutdown position of FIG. 9 and oscillating back and forth in opposite directions with respect to the shutdown position, which advantageously rapidly places the shaft 112 in the shutdown position and permits a shutdown of a nuclear environment 108 in which the control drum apparatus 106 is situated.

It is understood, however, that in alternative embodiments the rotation mechanism 130 or the rotation management system 132 or both can include a radially projected structure situated on the shaft 112 and a fixed stop situated on a support 114, by way of example. With such a geometry, the spring 133 can be configured such that it remains in an elastically deformed position even in the shutdown position of the shaft 112 and thus would bias the radially projecting structure against the fixed stop in order to retain the shaft 112 in the shutdown position of FIG. 9. In this regard, it is understood that the use of such a spring in combination with such a radially projecting structure and a fixed stop potentially could obviate the eddy current brake 136. Such a scenario is completely workable. It is understood, however, that the rotational velocity of the shaft 112 when it reaches the shutdown position may be unknown, and the engagement of the radially projecting structure with the fixed stop might result in a certain level of rotational oscillation of the shaft 112 if the radially projecting structure should rebound from the fixed stop. The eddy current brake 136 thus could still be usefully provided in combination with such a radially projecting structure and a fixed stop.

The rotation management system 132 further includes a lock 138 that includes an actuator 172, a bolt 168, and a receptacle 170. More specifically, the actuator is in the form of a linear stepper motor 176 that is situated on a first bracket 172 of the support 114, a rotatable seat 180 that is situated on a second bracket 178 of the support 114, and a threaded shaft 182 that extends between the stepper motor 176 and the rotatable seat 180. The threaded shaft includes a threaded collar 184 that is threadably situated thereon and to which the bolt 168 is affixed.

When the stepper motor 176 is electrically energized, it rotates the threaded shaft 182 which causes the threaded collar 184 to non-rotationally translate along the threaded shaft 182 between the first and second brackets 174 and 178 while carrying the bolt 168 therewith. That is, when the threaded shaft 182 rotates, the threaded collar 184 does not rotate therewith and rather the threaded collar 184 non-rotationally translates along the threaded shaft 182. As such, the actuator 172 is electrically operated to move the bolt 168 between a first location, such as is depicted generally in FIG. 11, which is a locked position of the lock 138, and a second location, such as is depicted generally in FIG. 10, in which the lock 138 is in an unlocked position. When the lock 138 is in the locked position, the bolt 168 is received in the receptacle 170, wherein the bolt 168 resists rotation of the shaft 112 away from the shutdown position of FIG. 11. When the lock 138 is in the unlocked position, the bolt 168 is spaced from the receptacle 170, which permits the shaft 112 to be rotated between the shutdown position of FIG. 11 and the operational position of FIG. 10.

Since the actuator 172 ceases movement if it is electrically unpowered, the actuator 172 can be unpowered in the locked position of the lock 138, such as during, transport of the nuclear environment 108 in which the control drum 106 is situated, while still retaining the shaft 112 in the shutdown position regardless of the presence or absence of electrical energy to the actuator 172. This advantageously retains the shaft 112 in the shutdown position and thereby avoids an unintended startup of the nuclear environment 108. Furthermore, the rotation mechanism 130 and the rotation management system 132 will rotate the shaft 112 from the operational position to the shutdown position in a very short time in the situation where the stepper motor 124 becomes electrically unpowered. This permits a rapid shutdown of the nuclear environment 108 in which the control drum 160 is situated.

It is understood that any of the teachings contained herein with respect to the rotation apparatus 104 can be implemented into the rotation apparatus 4 without departing from the spirit of the instant disclosure. In this regard, any of the teachings may be combined in any fashion to result in advantageous rotation apparatuses that are within the scope of the instant disclosure. Other variations will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A rotation apparatus usable with a control drum in a nuclear environment, the control drum having a shaft that is rotatable about an axis of rotation that is horizontal, a reflector portion situated on the shaft, an absorber portion situated on the shaft, and a motor which, when powered, is operable to move the shaft between an operational position wherein the reflector portion faces toward a core of the nuclear environment and a shutdown position wherein the absorber portion faces toward the core, the rotation apparatus comprising:
a rotation mechanism which is structured to apply to the shaft in the operational position a force that is structured to rotate the shaft toward the shutdown position, the force being resisted by the motor to retain the shaft in the operational position when the motor is powered, the force not being resisted when the motor is unpowered; and
a rotation management system that is structured to resist rotation of the shaft when the shaft is in the shutdown position.

2. The rotation apparatus of claim 1 wherein the rotation mechanism comprises a weight that is structured to be connected with the shaft and that is structured to be movable between a first position in the operational position of the shaft and a second position in the shutdown position of the shaft, the weight in the first position being vertically higher than in the second position and being movable by gravity from the first position to the second position when the motor is unpowered.

3. The rotation apparatus of claim 2 wherein the weight is a counterweight structured to be situated on the shaft such that a center of gravity of the counterweight is spaced from the axis of rotation, the counterweight situated on the shaft being structured to be movable with the shaft between the first position in the operational position of the shaft and the second position in the shutdown position of the shaft.

4. The rotation apparatus of claim 3 wherein the center of gravity is aligned in the vertical direction with the axis of rotation and disposed below the axis of rotation in the second position.

5. The rotation apparatus of claim 4 wherein the rotation management system comprises an electrically conductive structure situated on the shaft and an eddy current brake that comprises a number of magnets situated at opposite sides of the electrically conductive structure in the second position.

6. The rotation apparatus of claim 4 wherein the rotation mechanism further comprises a rotation initiator that comprises a pair of magnets, one of the magnets of the pair of magnets being structured to be situated on the control drum, the other of the magnets of the pair of magnets being structured to be situated on a support on which the control drum is disposed, the pair of magnets having their poles arranged to mutually oppose one another and being positioned to bias the control drum away from the operational position when the shaft is in the operational position, the bias being resisted by the motor when the motor is powered, the bias not being resisted when the motor is unpowered.

7. The rotation apparatus of claim 4 wherein the rotation mechanism further comprises a rotation initiator that comprises a spring that is structured to extend between the control drum and a support on which the control drum is disposed, the spring being positioned to bias the control drum away from the operational position when the shaft is in the operational position, the bias being resisted by the motor when the motor is powered, the bias not being resisted when the motor is unpowered.

8. The rotation apparatus of claim 3 wherein the rotation management system comprises at least one of a hard stop that is structured to be engaged by the control drum in the shutdown position and an eddy current brake that comprises a number of magnets.

9. The rotation apparatus of claim 1 wherein the rotation mechanism comprises a spring that is structured to apply the force to the shaft in the operational position to bias the shaft toward the shutdown position.

10. The rotation apparatus of claim 9 wherein the rotation management system comprises at least one of a hard stop that is structured to be engaged by the control drum in the shutdown position and an eddy current brake that comprises a number of magnets.

11. The rotation apparatus of claim 1 wherein the rotation management system comprises a lock that comprises a first portion and a second portion, the first portion being structured to be situated on one of the control drum and a support on which the control drum is disposed, the second portion being structured to be situated on the other of the control drum and the support, the lock being movable between a locked position wherein the first portion and the second portion are in a fixed relationship with one another and an unlocked position wherein one of the first portion and the second portion is movable with respect to the other of the first portion and the second portion.

12. The rotation apparatus of claim 11 wherein the shaft is in the shutdown position when the lock is in the locked position, the lock in the locked position being structured to resist movement of the shaft away from the shutdown position.

13. The rotation apparatus of claim 12 wherein the first portion is a bolt, wherein the second portion is a receptacle, and wherein the bolt is received in the receptacle in the locked position, the bolt being removed from the receptacle in the unlocked position.

14. The rotation apparatus of claim 13 wherein the receptacle is a cutout formed on the shaft, and wherein the bolt is structured to be situated on the support and to be movable on the support between a first location received in the receptacle and a second location removed from the receptacle.

15. The rotation apparatus of claim 14 wherein the lock further comprises an actuator that is structured to be disposed on the support, the bolt being disposed on the actuator, the actuator being structured to be operable to move the bolt between the first and second locations.

16. A control drum apparatus comprising the rotation apparatus of claim 1, the control drum apparatus being usable in a nuclear environment having a core and further comprising:
    a shaft that is rotatable about an axis of rotation that is horizontal;
    a control drum, the control drum having a reflector portion situated on the shaft and an absorber portion situated on the shaft; and
    a motor which, when powered, is operable to move the shaft between an operational position wherein the reflector portion faces toward the core and a shutdown position wherein the absorber portion faces toward the core.

\* \* \* \* \*